(12) United States Patent
Tran et al.

(10) Patent No.: US 8,548,265 B2
(45) Date of Patent: Oct. 1, 2013

(54) FAST MULTIPLIERLESS INTEGER INVERTIBLE TRANSFORMS

(75) Inventors: Trac D. Tran, Columbia, MD (US); Pankaj N. Topiwala, Clarksville, MD (US)

(73) Assignee: FastVDO, LLC, Columbia, MD (US)

(*) Notice: Subject to any disclaimer, the term of this patent is extended or adjusted under 35 U.S.C. 154(b) by 1306 days.

(21) Appl. No.: 11/649,491

(22) Filed: Jan. 4, 2007

(65) Prior Publication Data

US 2007/0196025 A1      Aug. 23, 2007

Related U.S. Application Data

(60) Provisional application No. 60/756,404, filed on Jan. 5, 2006.

(51) Int. Cl.
*G06K 9/36*      (2006.01)

(52) U.S. Cl.
USPC .......................................... 382/250; 382/248

(58) Field of Classification Search
USPC ................................................. 382/248, 250
See application file for complete search history.

(56) References Cited

U.S. PATENT DOCUMENTS 5,682,404 A * 10/1997 Miller ............................ 375/222
6,421,464 B1 * 7/2002 Tran et al. ..................... 382/232

* cited by examiner

*Primary Examiner* — Sath V Perungavoor
*Assistant Examiner* — Jeffery Williams
(74) *Attorney, Agent, or Firm* — Dickstein Shapiro LLP

(57) ABSTRACT

This invention relates to the design and implementation of a large family of fast, efficient, hardware-friendly fixed-point multiplierless inverse discrete cosine transforms (IDCT) and the corresponding forward transform counterparts. All of the proposed structures comprises of butterflies and dyadic-rational lifting steps that can be implemented using only shift-and-add operations. The approach also allows the computational scalability with different accuracy-versus-complexity trade-offs. Furthermore, the lifting construction allows a simple construction of the corresponding multiplierless forward DCT, providing bit-exact reconstruction if properly pairing with our proposed IDCT. With appropriately-chosen parameters, all of the disclosed structures can easily pass IEEE-1180 test. The high-accuracy algorithm of the present invention is over 100 times more accurate than IEEE-1180 specifications, leading to practically drifting-free reconstruction in popular MPEG-2 and MPEG-4 codecs even at the lowest quantization setting.

33 Claims, 6 Drawing Sheets

FAST MULTIPLIERLESS INTEGER INVERTIBLE TRANSFORMS

CROSS REFERENCE TO RELATED APPLICATIONS

This application relates to and claims priority under 35 U.S.C 109(e) from U.S. Provisional Application Ser. No. 60/756,404, filed Jan. 5, 2006, entitled "Fast Fixed-Point Multiplier-less DCT/IDCT Approximation", which is hereby incorporated by reference in the entirety.

BACKGROUND OF THE INVENTION

1. Field of the Invention

The present invention relates to an apparatus and a method for processing uni- and multi-dimensional discrete signals such as audio, radar, sonar, natural images, photographs, drawings, multi-spectral images, volumetric medical image data sets, video sequences, etc. It further relates to the processing of such signals, images, video, and other multi-dimensional signals which are captured directly in digital format or after they have been converted to or expressed in digital format. This invention further relates to use of fast and efficient reconstruction methods to increase the processing speed for digital signal storage and transmission, especially in fixed-point hardware implementations. More particularly, the present invention relates to the processing of image/video data.

2. Description of the Related Art

Invertible transformations, especially unitary ones, have been in frequent use in signal processing for decades, for both their energy compaction as well as signal analysis benefits, Perhaps the most common example is the Fast Fourier Transform, and its various close relatives. The discrete cosine transform (DCT), a well-known such relative, which is in fact an orthogonal transformation of sets of real-valued coefficients, has been at the heart of the algorithmic structure of many international standards such as JPEG, H.26x, and the MPEG family of standards, as discussed for example in J. Mitchell, W. Pennebaker, C. Fogg, and D. LeGall, *MPEG Video Compression Standard*, Chapman and Hall, New York, 1996. It has satisfactory performance in terms of signal energy compaction capability, and many fast algorithms for the DCT and its inverse transform, the so-called IDCT, have been proposed. One type of the fast algorithms is based on various sparse factorizations of the DCT/IDCT matrix such as Chen's factorization in W. Chen, C. Harrison, and S. Fralick, "A fast computational algorithm for the discrete cosine transform," *IEEE Trans. Communications*, vol. COM-25, pp. 1004.1011, 1977 and Loeffler's factorization as in C. Loeffler, A. Lightberg, and G. Moschytz, "Practical fast 1-D DCT algorithms with 11 multiplications," in *Proc. IEEE ICASSP*, vol. 2, pp. 988-991, 1989. To achieve fast implementations, floating-point coefficients in these algorithms are usually scaled and approximated by integers such that floating-point multiplications in DCT/IDCT can be replaced by integer multiplications, and potentially with only additions and bitshifts.

The use of fixed-point DCT/IDCT implementations results in approximation errors when compared with the ideal DCT/IDCT. Until recently, existing standards such as MPEG-1, 2, 4, have required that all approximate IDCTs meet certain accuracy requirements (the IEEE-1180 Standard, see below) to the true floating point IDCT. As different video/image decoders have the freedom to employ different IDCT fixed-point approximations, it leads to the mismatched reconstruction of the decoded frame relative to the encoder's model of the intended decoded picture. Subsequent inter-picture prediction from the aforementioned mismatched P-frame results in error accumulation and generates the so-called drifting effects. Annoying drifting problems can degrade decoded video quality quickly, especially when the encoder has a minimal amount of intra-block refresh.

Recently, MPEG has embarked on an effect to develop a new voluntary standard specifying a particular fixed-point approximation to the ideal IDCT function, and has a call for proposals on fixed-point 8×8 IDCT and DCT Standards in G. Sullivan and A. Luthra, "Call for proposals on fixed-point 8×8 IDCT and DCT standard," MPEG input contribution N7099, April 2005. This Call for Proposals (CfP) requires an approximation that is within a specified degree of precision relative to the ideal function definition of the IDCT. And the accuracy requirements are compliant to the now-obsolete IEEE-1180 standard described in IEEE CAS Standards Committee, "IEEE standard specification for the implementation of 8×8 inverse discrete cosine transform," *IEEE Standard* 1180-1990, December 1990, which has specified a set of well-known evaluation criteria for the accuracy of fixed-point IDCT implementations. The more recent *ISO/IEC MPEG 23002-1 Standard, "Accuracy requirements for implementation of integer-output 8×8 inverse discrete cosine transform,"* which is effectively identical, now replaces this standard; however, since the IEEE-1180 tests are still better known, we will continue to refer to them. In reality, the new MPEG 23002-1 Standard is implied.

Generally, a fixed-point IDCT algorithm implemented within a wider data bus width (e.g., the number of bits of representation needed for the transformation process) can have higher approximation accuracy than one with a lower bus width. However, the added data bus width is costly in VLSI implementation, and especially in mobile devices, where the CPU capability, bus width, and battery power are severely limited.

In the field of fixed-point IDCT designs (such as two fast algorithms in the public-domain JPEG source code), irrational multiplication parameters are directly scaled up and then approximated as the nearest integers, often suffering from poor approximation accuracy despite very high parameter resolution.

Therefore, it is an object of this invention to provide high-accuracy approximations of the IDCT that can still be implemented with a narrow bus width via simple arithmetic operations such as shifting operations and binary additions. It is a further object of this invention to provide a method of constructing useful alternative representations and approximations of invertible transforms.

The current invention is related to the invention disclosed in the Reissue U.S. patent application Ser. No. 10/629,303 of U.S. Pat. No. 6,421,464, to Trac D. Tran and Pankaj Topiwala, both of which are hereby incorporated by reference in the entirety.

SUMMARY OF THE INVENTION

The invention provides systematic designs as well as implementation methods for a large class of fixed-point invertible transformations. The key illustrative examples of DCT and IDCT transforms are treated in particular, which can all pass the IEEE-1180 tests (also known as the MPEG 23002-1 tests), maintain satisfactory compatibility with the floating-point IDCT, and along with similar forward transform counterparts form perfect invertible systems (signals passing throughout the claimed FDCT and IDCT pair get reconstructed perfectly without any error). The parameters in the structures of current invention are frequently approximated carefully by dyadic rationals, leading to fast and efficient multiplierless hardware implementation.

In one implementation, a series of dyadic-rational lifting steps in combination with the traditional butterfly of [1 1; −1 1] or [1 −1; 1 1] to construct highly-accurate multiplierless IDCTs are used that are compatible with either the floating-point IDCT or to general integer approximations of the IDCTs that are already deployed in practical image/video compression systems.

In accordance with the present invention, a systematic approach toward the design and implementation of the large family of IDCT algorithms includes the following steps:

- Start from any sparse factorization of the IDCT matrix. The Loeffler structure and one of its variations are used as examples.
- Convert the resulting structure from the sparse factorization into a cascade of butterflies and lifting steps (also known as the ladder structure or shear operations).
- Approximate each floating-point lifting step by a dyadic-rational parameter of the form $m/2^k$ where m and k are integers.
- Choose the set of dyadic parameters that permit passing the approximation specifications, for example, the old standard-compliance IEEE-1180 test, or the MPEG 23002-1 test.
- For multi-dimensional separable implementations, choose the amount of data up-shift based on the given bus width requirement.
- Obtain the appropriate forward transform by reversing the signal flow and inverting the sign polarity of each dyadic lifting parameter.

The main features of the solutions according to the present invention are a series of approximate IDCT solutions that span the range of possibilities, as further explained below. With these examples, we indicate that the entire range of the complexity/accuracy scale can be efficiently achieved according to the present invention.

- The high-accuracy algorithm provides a very close approximation of the floating-point FDCT/IDCT, whose accuracy is perhaps unsurpassed in the literature, while still keeping the implementation complexity reasonable;
- The low-complexity algorithm attains the lowest level of computational complexity in our structure that can still comfortably pass all of the compliance tests;
- The 16-bit algorithm represents our current best approach within a 16-bit architecture: all of the inputs, outputs, and registers are limited to no more than 16-bit resolution.
- All of the compliance requirements are met, including the near-DC inversion and the all-zero-input test.
- The solutions are computationally scalable. In other words, a variety of accuracy versus complexity trade-offs can be easily achieved by simply adding or removing dyadic fractions in the approximation of the theoretical parameters. The super high-accuracy level leads to almost drifting-free reconstruction when pairing with a 64-bit floating-point precision IDCT in the encoder.
- Low word-length requirements for structure as well as intermediate data representation. A 24-bit multiplierless implementation is easily achievable. In fact, a true 16-bit implementation (inputs, outputs, registers, as well as internal bus width) is compliant with the original IEEE-1180 test.
- The structure comprises of regular stages, convenient for pipelining.
- All of our proposed algorithms in this invention are non-scaled DCT/IDCT algorithms; they do not require the modification of the quantization/inverse quantization stage.
- The forward DCT approximation is obtained by simply reversing the signal flow and inverting the polarity of a few parameters. Bit-exact reconstruction is possible given that the range restriction on the DCT coefficients is extended by 2 more bits (14-bit representation of DCT coefficients instead of 12). Again, different accuracy-versus-complexity trade-offs can be achieved just like the case with the inverse.

In one implementation, an apparatus is provided for block coding of windows of digitally represented signal elements of block size M, wherein M is any integer greater than unity, chosen from one of the dimensionalities of the signal. The apparatus comprises an invertible transformation of the signal elements, wherein the invertible transformation is an approximation of a discrete cosine transform (DCT) or an inverse discrete cosine transform (IDCT), and the approximation is representable by a series of at least one of the following elements: i) butterfly steps; ii) lifting steps, wherein the choice of coefficients is real; and iii) planar rotations. In one implementation, the lifting steps have rational coefficients.

In another implementation, the lifting steps have dyadic rational coefficients in the form of $$\frac{k}{2^n}$$

where k and n are integers.

In yet another implementation, the lifting steps have coefficients selected within a $$\pm\frac{1}{8}$$

range from their theoretical values listed in Tables 1, 2, or 3 of this application.

In yet another implementation, the approximate transform is representable using only butterflies and lifting steps.

In yet another implementation, an apparatus for coding, storing, transmitting, or decoding length M blocks of digitally represented signal elements is provided, includes:

a. a means for preprocessing the signal elements, such as prediction processing;
b. a forward transform of resulting modified signal elements;
c. a means for quantizing, and entropy coding of the transform output coefficients;
d. a means for transmission or storage of the coded data;
e. a means for decoding the entropy coded data;
f. a means for dequantizing the quantized, transform coefficients;
g. an inverse transform of the dequantized data, defined as the inverse of the transform of step (a), to recover the reconstructed, modified signal elements; and
h. a means for post-processing of the reconstructed, modified signal elements, to recover the reconstructed signal elements.

In yet another implementation, a method is provided for coding, storing, transmitting, or decoding length M blocks of digitally represented signal elements includes the steps of:

a. pre-processing, such as prediction processing, signal elements to modify the signal elements;
b. forward transforming the modified signal elements;
c. quantizing and entropy coding transform output coefficients;
d. transmitting or storing entropy coded data;
e. decoding the entropy coded data;
f. dequantizing the quantized transform output coefficients;
g. inverse transforming the dequantized transform output coefficients to reconstruct the modified signal elements; and
h. post-processing of the modified signal elements to reconstruct the modified signal elements.

DESCRIPTION OF THE PREFERRED EMBODIMENT

The Forward and Inverse Transform

In signal processing, invertible block transformations are frequently used to decorrelate the signal samples, or in general for signal analysis; the inverse of the transform is then used for signal recovery or signal synthesis. Block-based processing with blocks of samples of length M may be used, and the invertible transform may be selected to have special properties, for example be unitary. In multi-dimensional signals, this processing approach is typically applied separably in each of the signal dimensions. For example, in image processing, a unitary transform in common use is the so-called discrete cosine transform (DCT), or its inverse, the IDCT. Typically, a block transform for image processing is applied to a block (or window) of, for example, an M×N group of pixels (or in the inverse case, group of transform coefficients) and the process is iterated over the entire image. The block-wise IDCT (also known as a type-III DCT, unitary formulation) for an M×N block of inverse-quantized transform coefficients $\hat{F}_{m,n}(u, v)$ at position (mM, nN) in a picture or frame can be defined as follows:

$$\hat{f}(mM+x, nN+y) = \sum_{u=0}^{M-1} \sum_{v=0}^{N-1} \left(c_u \sqrt{\frac{2}{M}}\right) \left(c_v \sqrt{\frac{2}{N}}\right) \hat{F}_{m,n}(u, v) \cdot \cos\left[\frac{(2x+1)u\pi}{2M}\right] \cdot \cos\left[\frac{(2y+1)v\pi}{2N}\right]$$

for x=0 . . . M and y=0 . . . N.

The forward DCT (also known as a type-II DCT, unitary formulation) for an M×N block of spatial-domain samples f(mM+x, nN+y) at position (mM, nN) in a picture can be defined as follows:

$$F_{m,n}(u, v) = \sum_{x=0}^{M-1} \sum_{y=0}^{N-1} \left(c_u \sqrt{\frac{2}{M}}\right) \left(c_v \sqrt{\frac{2}{N}}\right) f(mM+x, nN+y) \cdot \cos\left[\frac{(2x+1)u\pi}{2M}\right] \cdot \cos\left[\frac{(2y+1)v\pi}{2N}\right]$$

for u=0 . . . M and v=0 . . . N. The constants used in these equations defined as follows:

$c_u = 1/\sqrt{2}$ for u=0, otherwise 1.

$c_v = 1/\sqrt{2}$ for v=0, otherwise 1.

In the JPEG and MPEG standards relevant to this invention, both M and N are equal to 8. Note that since the values of the cosine function that are used in these formulas are irrational numbers, any implementation of these functions requires some amount of approximation (although double-precision floating-point implementation can be considered effectively exact).

Sparse Factorizations and Rotation-Based Structure

Figure 1:
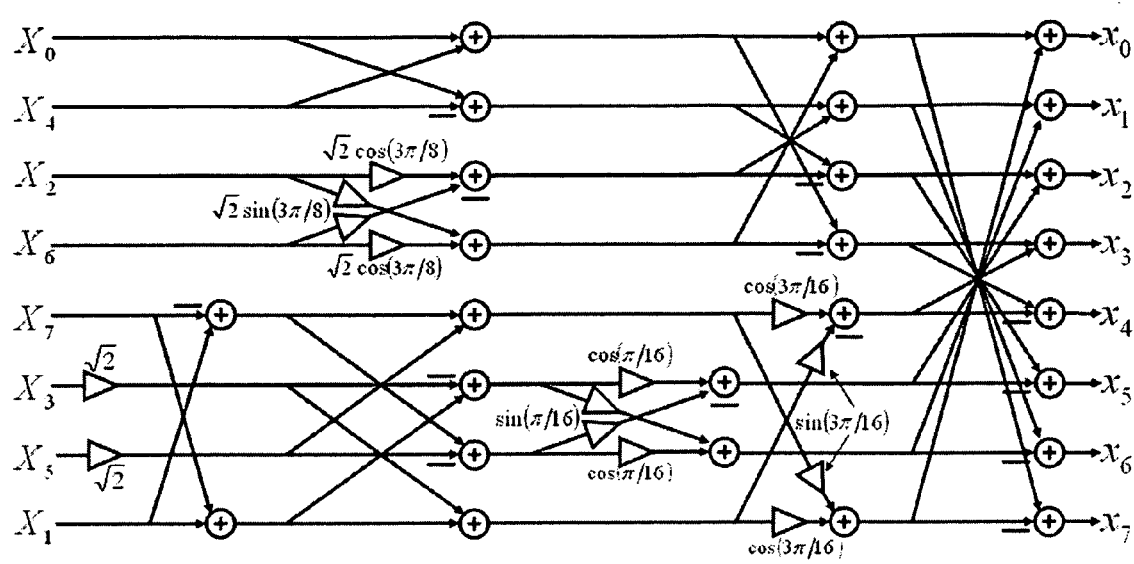
FIG. 1 depicts a typical sparse factorization of the IDCT matrix. This particular structure is known as the Loeffler structure which can be implemented using only 11 multiplications in 1D.

An elegant factorization for eight-point IDCT was proposed in C. Loeffler, A. Lightberg, and G. Moschytz, "Practical fast 1-D DCT algorithms with 11 multiplications," in *Proc. IEEE ICASSP*, vol. 2, pp. 988-991, 1989. The resulting structure is depicted in FIG. 1. This 8-point structure contains a 4-point IDCT and it requires 11 multiplications (achieving the multiplication lower bound) and 29 additions. The structure is non-scaled, i.e., it requires a uniform scaling factor of $1/\sqrt{8}$ at the end of flow graph to complete true 1-D IDCT transform. Hence, it does not require any modification of the quantization/inverse quantization stages if it is used in image/video applications. In a 2D separable implementation, the scaling factor becomes ⅛ which is a simple 3-bit right-shift operation. Another advantage of the structure is that the two major plane rotations π/16 and 3π/16 are close to the final output butterfly, which can delay approximation errors at the beginning of the flow graph, leading to high-accuracy IDCT approximation.

Figure 2:
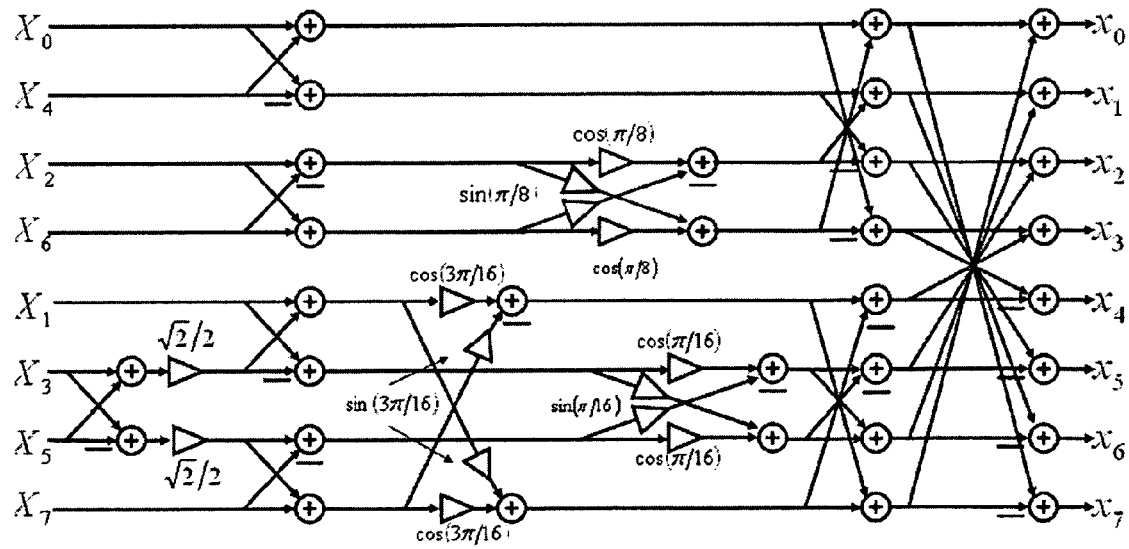
FIG. 2 depicts a variation of the Loeffler structure via several simple matrix permutations and manipulations. This structure yields exactly the same output as the original Loeffler structure in FIG. 1.

A variation of this structure is depicted in FIG. 2 where a few matrix permutations have been performed. This modified structure illustrates the non-uniqueness property of sparse IDCT factorization. In other words, there are countless structures that can perform the same operations described in the previous FDCT/IDCT section. Our approach can be applied to any of such factorization.

This method, developed for the (I)DCT, can in fact be developed more generally. Similar methodologies apply to general unitary transforms, using complex valued factorizations. Each unitary transform can be factorized as a product of rotations and reflections (where x->-x). The rotations can be further factorized as a product of a finite number of planar rotations. The singular value decomposition, which provides a factorization of a general invertible transform into one with only unitary transforms and diagonal transforms (i.e., scaling factors in each channel), then allows the application of this methodology to invertible transforms. Our methodology, developed for the (I)DCT for illustration purposes only, applies in general.

Lifting Step or Ladder Structure or Shear Operation

It is also well known that any plane rotation can be further factorized, and performed by 3 "shears" operations, which appear as upper- or lower-triangular matrices, as follows:

$$\begin{bmatrix} \cos\theta_i & -\sin\theta_i \\ \sin\theta_i & \cos\theta_i \end{bmatrix} = \begin{bmatrix} 1 & \frac{\cos\theta_i - 1}{\sin\theta_i} \\ 0 & 1 \end{bmatrix} \begin{bmatrix} 1 & 0 \\ \sin\theta_i & 1 \end{bmatrix} \begin{bmatrix} 1 & \frac{\cos\theta_i - 1}{\sin\theta_i} \\ 0 & 1 \end{bmatrix}$$

$$= \begin{bmatrix} 1 & -\tan\frac{\theta_i}{2} \\ 0 & 1 \end{bmatrix} \begin{bmatrix} 1 & 0 \\ \sin\theta_i & 1 \end{bmatrix} \begin{bmatrix} 1 & -\tan\frac{\theta_i}{2} \\ 0 & 1 \end{bmatrix}$$

$$= \begin{bmatrix} 1 & 0 \\ \frac{1-\cos\theta_i}{\sin\theta_i} & 1 \end{bmatrix} \begin{bmatrix} 1 & -\sin\theta_i \\ 0 & 1 \end{bmatrix} \begin{bmatrix} 1 & 0 \\ \frac{1-\cos\theta_i}{\sin\theta_i} & 1 \end{bmatrix}$$

$$= \begin{bmatrix} 1 & 0 \\ \tan\frac{\theta_i}{2} & 1 \end{bmatrix} \begin{bmatrix} 1 & -\sin\theta_i \\ 0 & 1 \end{bmatrix} \begin{bmatrix} 1 & 0 \\ \tan\frac{\theta_i}{2} & 1 \end{bmatrix}.$$

Figure 3:
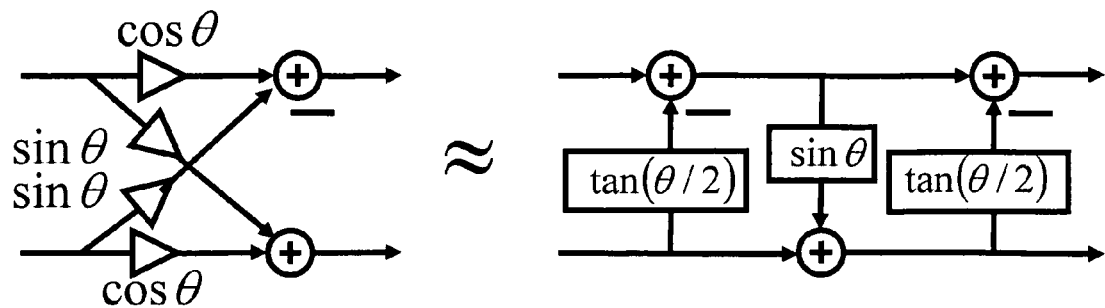
FIG. 3 portrays the general and equivalent rotation-to-lifting conversion.

All equivalent relationships above can be easily verified by computation. In signal processing terminology, a "lifting" step is a matrix operation that is either upper- or lower-triangular whereas $$\tan\frac{\theta_i}{2} \text{ and } \sin\theta_i$$

are called lifting parameters. The signal processing flow diagram of this operation is shown in FIG. 3.

One special case is when the rotation angle is 45-degree. In this case, the plane rotation becomes the special matrix $$\frac{1}{\sqrt{2}}\begin{bmatrix} 1 & -1 \\ 1 & 1 \end{bmatrix}$$

where the scaling factor $1/\sqrt{2}$ is usually delayed and/or combined with others. The remaining orthogonal matrix $$\begin{bmatrix} 1 & -1 \\ 1 & 1 \end{bmatrix}$$

is commonly referred to as the butterfly operation. Since the butterfly is already integer-friendly (after all, it simply computes the sum and the difference of the two given inputs), we never have to convert the butterfly to lifting steps. Note that the inverse operation of a butterfly is another butterfly (the location of the −1 entry might vary).

To invert a lifting step, we simply need to subtract out what was added in at the forward lifting step. Hence, the original signal can still be perfectly reconstructed even if the floating-point multiplication results in the lifting steps are rounded to integers, as long as the same procedure is applied to both the forward and inverse routines. Therefore, perfect reconstruction is guaranteed by the lifting structure itself. This is the key to our construction of matching FDCT/IDCT pairs.

Lifting-Based Fixed-Point Construction

Starting with any existing rotation-based structure, each of the rotation angles is then converted to three lifting steps as shown in Section C. The lifting step at this stage usually has an irrational theoretical value, which in practice requires a very accurate floating-point architecture. In this invention, we propose a systematic approach to approximate this irrational parameter with a fixed-point structure that requires only simple binary shift-and-add operations. This method is demonstrated by a concrete example in FIG. 4. First, the rotation of $$\frac{\pi}{8}$$

is converted into a cascade of three lifting steps with the parameter set $$\{\tan\frac{\pi}{16}, \sin\frac{\pi}{8}, \tan\frac{\pi}{16}\}$$

which is represented as the set of floating-point values {0.19891236737966,0.38268343236509,0.19891236737966} in a 64-bit architecture. We replace these cumbersome floating-point multiplications by approximating them as dyadic-rational parameters of the form $$\frac{k}{2^n}$$

which can be expanded as sum/difference of pure power-of-two, and hence can be implemented by only binary shift and addition operations. In the concrete example shown in FIG. 4, the chosen set of dyadic-rational lifting steps $$\text{is } \left\{\frac{407}{2048}, \frac{49}{128}, \frac{407}{2048}\right\}.$$

Figure 4:
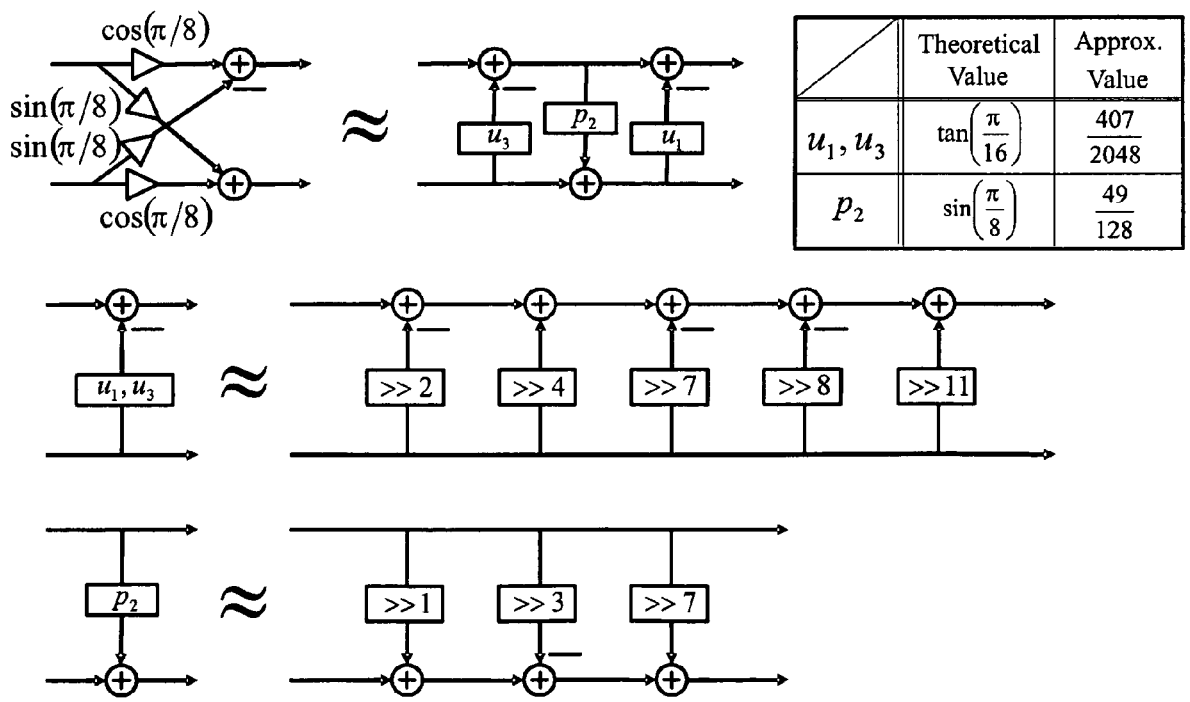
FIG. 4 depicts an example of FIG. 3, outlining an approximation procedure for a set of rotations by a sequence of lifting steps.

Since $407/2048$ and $49/128$ can both be represented as sum/difference of pure powers-of-two as $$\frac{407}{2048} = \frac{1}{4} - \frac{1}{16} + \frac{1}{128} + \frac{1}{256} - \frac{1}{2048}$$
$$= \frac{1}{2^2} - \frac{1}{2^4} + \frac{1}{2^7} + \frac{1}{2^8} - \frac{1}{2^{11}}$$

$$\frac{49}{128} = \frac{1}{2} - \frac{1}{8} + \frac{1}{128} = \frac{1}{2^1} - \frac{1}{2^3} + \frac{1}{2^7},$$

we finally arrive at the resulting shift-and-add only implementation depicted in FIG. 4 where >>k denotes the right-shift or down-shift operation by k binary places.

Another method of implementing these dyadic lifting steps via shift-and-add operations is to realize the numerator by sums and differences of left-shifts (up-shifts) followed by a single right-shift (down-shift) to realize the denominator. For example, the multiplication of $$\frac{49}{128}x$$

using this approach can be implemented as ((x<<6)−(x<<4)+x+64)>>7 since $$\frac{49}{128}x = \frac{x(64-16+1)}{128} = \frac{x(2^6 - 2^4 + 1)}{2^7}.$$

Figure 5:
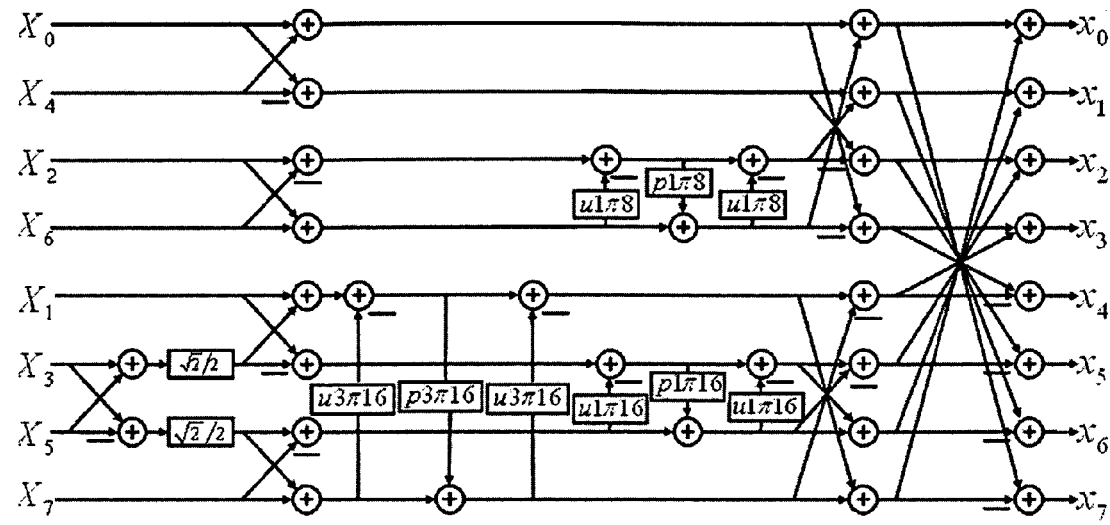
FIG. 5 depicts a lifting-based 16-bit multiplierless IDCT design example. A set of parameters that can be employed in this structure is shown in Table 1.

Our systematic approach of dyadic lifting approximation is then applied to every rotation angles in any rotation-based sparse IDCT factorization. If the structure in FIG. 2 is the starting point, the resulting lifting-based IDCT structure is illustrated in FIG. 5. Different accuracy versus complexity trade-offs can be achieved by adding or removing dyadic fractions in the approximation of the irrational theoretical parameters, leading to scalable computational capability. An example of a good set of dyadic parameters is tabulated in Table 1 where the theoretical values in the structure will yield the true IDCT while the dyadic approximations yield our fixed-point IDCT algorithm. Multiplierless implementation can be easily derived as well by computing the dyadic parameters using only shift-and-add operations. This IDCT approximation turns out to fit within a 16-bit architecture as well.

TABLE 1

Example of parameters chosen for the 16-bit lifting-based IDCT algorithm in FIG. 5.

| Parameter | Theoretical Value | Dyadic Approximation | Multiplierless Implementation |
|---|---|---|---|
| p1π8 | $\sin(\pi/8)$ | 3135/8192 | ((x << 11) + (x << 10) + (x << 6) − x + 4096) >> 13 |
| u1π8 | $\tan(\pi/16)$ | 3259/16384 | ((x << 11) + (x << 10) + (x << 7) + (x << 6) − (x << 2) − x + 8192) >> 14 |
| sqrt2 | $1/\sqrt{2}$ | 11585/16384 | ((x << 13) + (x << 11) + (x << 10) + (x << 8) + (x << 6) + x + 8192) >> 14 |
| p1π16 | $\sin(\pi/16)$ | 12785/65536 | ((x << 13) + (x << 12) + (x << 9) − (x << 4) + x + 32768) >> 16 |
| u1π16 | $\tan(\pi/32)$ | 3227/32768 | ((x << 11) + (x << 10) + (x << 7) + (x << 5) − (x << 2) − x + 16384) >> 15 |
| p3π16 | $\sin(3\pi/16)$ | 4551/8192 | ((x << 12) + (x << 9) − (x << 6) + (x << 3) − x + 4096) >> 13 |
| u3π16 | $\tan(3\pi/32)$ | 2485/8192 | ((x << 11) + (x << 9) − (x << 6) − (x << 3) − (x << 1) − x + 4096) >> 13 |

Another example is the high-accuracy design whose objective is to approximate the true IDCT as closely as possible within a 32-bit fixed-point architecture. The resulting algorithm is shown in FIG. 6 where the parameters are chosen as in Table 2.

TABLE 2

Figure 6:
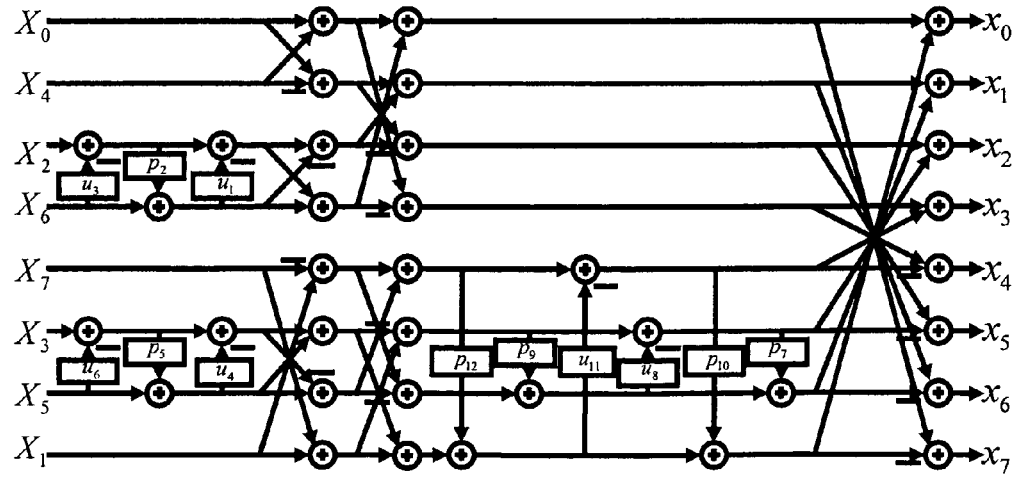
FIG. 6 depicts a highly-accurate lifting-based 32-bit multiplierless IDCT design example. A set of parameters that can be employed in this structure is shown in Table 2.

Example of parameters chosen for the highly accurate 32-bit lifting IDCT algorithm in FIG. 6.

| Parameter | Theoretical Value | Dyadic Approximation | Multiplierless Implementation |
|---|---|---|---|
| p2 | $\sin(\pi/8)$ | 50159/131072 | y = (1 >> 2) + w − (w >> 10), where w = (1 >> 3) + (1 >> 7) |
| u1, u3 | $\tan(\pi/16)$ | 3259/16384 | y = w + (w >> 4) − (1 >> 12) − (1 >> 14), where w = (1 >> 3) + (1 >> 4) |
| p5 | $\sin(\pi/4)$ | 46341/65536 | y = w + (w >> 3) + (1 >> 8) + (w >> 13), where w = (1 >> 1) + (1 >> 3) |
| u4, u6 | $\tan(\pi/8)$ | 217167/524288 | y = (1 >> 2) + w + (1 >> 7) + (w >> 10) − (1 >> 19), where w = (1 >> 3) + (1 >> 5) |
| p7, p9 | $\tan(\pi/32)$ | 25819/262144 | y = (1 >> 4) + w + (1 >> 10) − (w >> 8) − (1 >> 18), where w = (1 >> 5) + (1 >> 8) |
| u8 | $\sin(\pi/16)$ | 25571/131072 | y = w + (1 >> 7) − (1 >> 12) + (w >> 13), where w = (1 >> 3) + (1 >> 4); |
| p10, p12 | $\tan(3\pi/32)$ | 2485/8192 | y = w − (w >> 5) + (w >> 9), where w = (1 >> 2) + (1 >> 4) |
| u11 | $\sin(3\pi/16)$ | 145639/262144 | y = (1 >> 1) + w + (w >> 6) + (w >> 11), where w = (1 >> 4) − (1 >> 7) |

Figure 7:
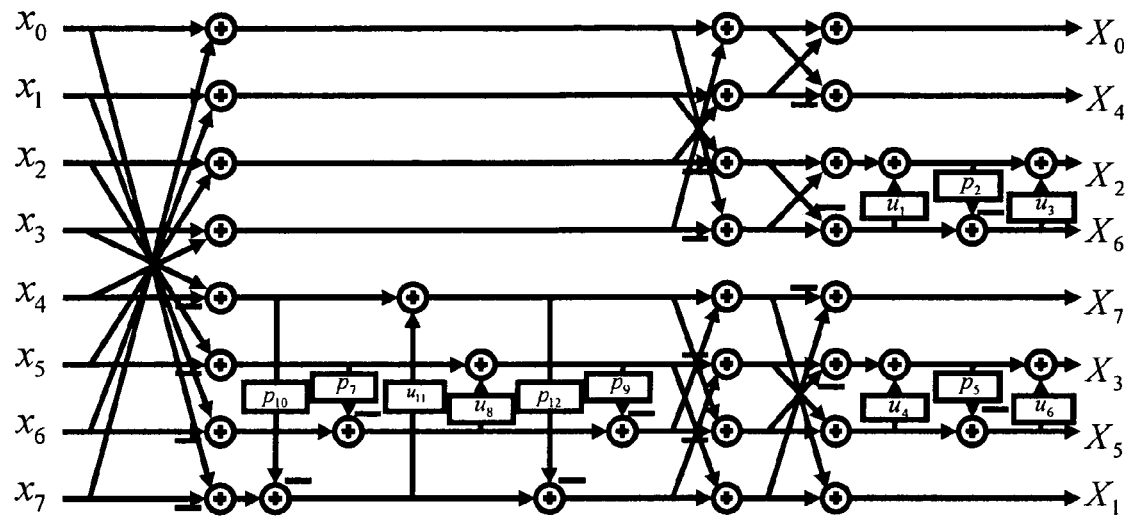
FIG. 7 depicts the lifting-based multiplierless FDCT that is matched perfectly with the proposed IDCT in FIG. 5.

Since the inverse of the butterfly is another butterfly while the inverse of the lifting step is another lifting step with reverse sign polarity, it is trivial to construct the corresponding forward transform as shown in FIG. 7.

Figure 8:
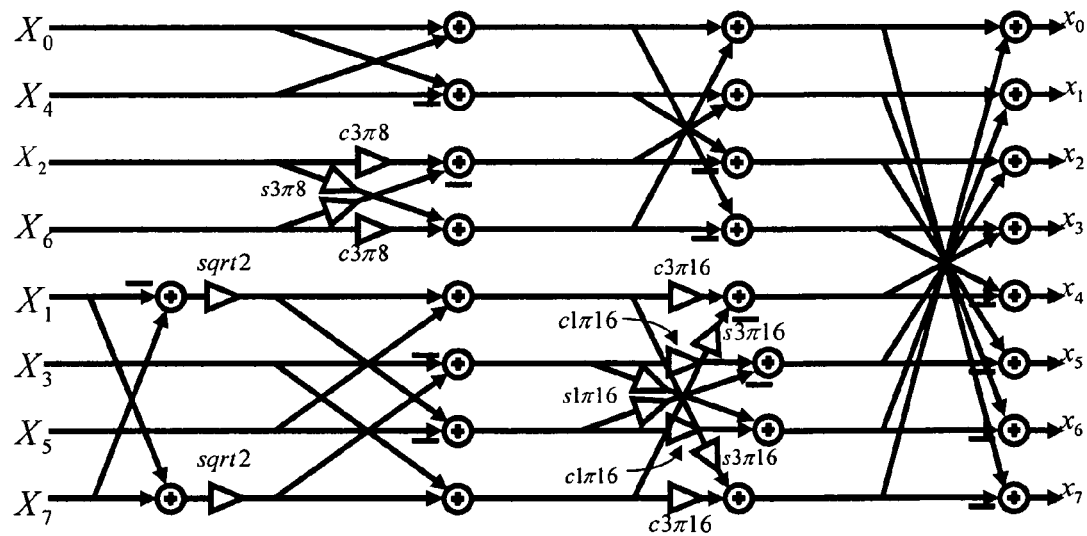
FIG. 8 depicts a rotation-based 16-bit multiplierless IDCT design example. A set of parameters that can be employed in this structure is shown in Table 3.
Figure 9:
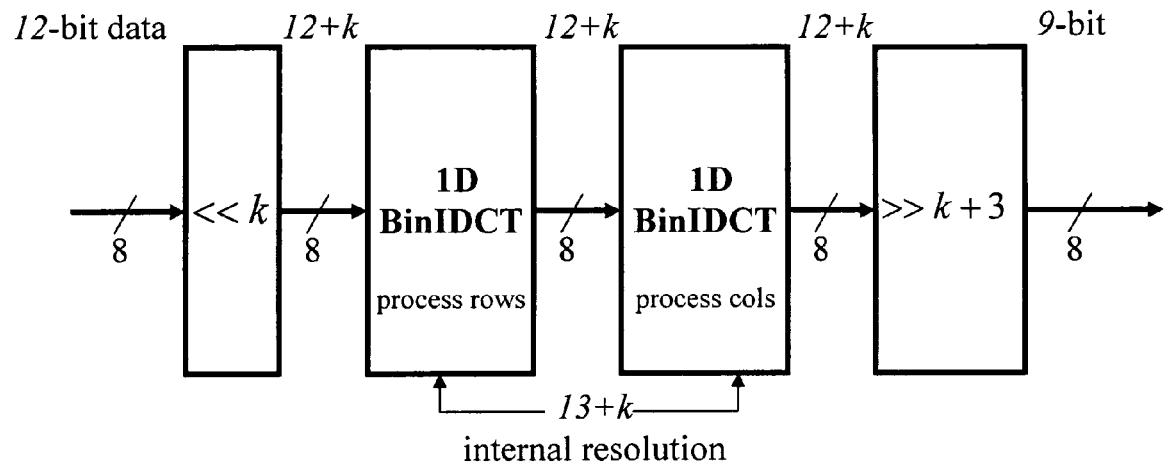
FIG. 9 illustrates the dynamic range (bus width) required for the 2D separable implementation of the claimed IDCT where k is the amount of left-shift that can be applied before the transform process to improve accuracy and k+3 is the amount of right-shift that can be applied after the transform process is complete. 16-bit architectures requires k=3 while in 32-bit architectures, k can be as large as 19.

Another low-complexity 16-bit design is shown in FIG. 8 with the parameters chosen as in Table 3. This algorithm demonstrates that lifting is not the only working approach in fixed-point IDCT design. If the matching FDCT is not of a concern, a rotation-based structure is also feasible.

tion for the implementation of 8×8 inverse discrete cosine transform," *IEEE Standard* 1180-1990, December 1990.

In this IEEE-1180 test, an 8×8 block of integers is randomly generated and fed into double-precision floating-point forward DCT. The output DCT coefficients are then passed through 64-bit floating-point IDCT and the proposed fixed-point IDCT, respectively. The accuracy is measured based on the reconstructed integers from these two IDCTs. Specifically, the peak pixel-wise error (ppe), peak mean-squared

TABLE 3

Example of the parameter set chosen for the 16-bit IDCT algorithm depicted in FIG. 7.

| Parameter | Theoretical Value | Dyadic Approximation | Multiplierless Implementation |
|---|---|---|---|
| c3π8 | $\sqrt{2}\cos(3\pi/8)$ | 8867/16384 | $((x << 13) + (x << 9) + (x << 7) + (x << 5) + (x << 1) + x + 8192) >> 14$ |
| s3π8 | $\sqrt{2}\sin(3\pi/8)$ | 21407/16384 | $((x << 14) + (x << 12) + (x << 10) - (x << 6) - (x << 5) - x + 8192) >> 14$ |
| sqrt2 | $1/\sqrt{2}$ | 11585/16384 | $((x << 13) + (x << 11) + (x << 10) + (x << 8) + (x << 6) + x + 8192) >> 14$ |
| c1π16 | $\sqrt{2}\cos(\pi/16)$ | 5681/4096 | $((x << 12) + (x << 10) + (x << 9) + (x << 5) + (x << 4) + x + 2048) >> 12$ |
| s1π16 | $\sqrt{2}\sin(\pi/16)$ | 565/2048 | $((x << 9) + (x << 5) + (x << 4) + (x << 2) + x + 1024) >> 11$ |
| c3π16 | $\sqrt{2}\cos(3\pi/16)$ | 9633/8192 | $((x << 13) + (x << 10) + (x << 8) + (x << 7) + (x << 5) + x + 4096) >> 13$ |
| s3π16 | $\sqrt{2}\sin(3\pi/16)$ | 12873/16384 | $((x << 13) + (x << 12) + (x << 9) + (x << 6) + (x << 3) + x + 8192) >> 14$ |

Dynamic Range in Implementation

In order to improve approximation accuracy, the input DCT vector coefficients X need to be up-scaled by certain K bits before they feed into IDCT. The value of K depends on the dynamic range of our IDCT scheme. However, we cannot directly assume X can be randomly generated. Instead, we calculate the maximum or minimum output of each subband by generating the worse-case inputs X=Cx where the integer vector x can be randomly assigned and C is the ideal type-II DCT matrix as described in Section A. As all lifting parameters are less than unity and implemented with addition and right-shift operations, they minimize the intermediate dynamic range. It can be verified that the absolute value of the worst intermediate result in each lifting steps is less than that of its final output.

For 8-bit video signal, input sample values to the DCT x after motion estimation and compensation are in the range of [−256, 255]. Hence, the DCT coefficients X can be shown to be within the 12-bit range [−2048, 2047]. The outputs of our 1-D IDCT design in FIG. 5 and FIG. 6 would be still within [−2048, 2047] without the $1/\sqrt{8}$ down-scaling. The maximum intermediate data have 13-bit range due to the internal butterflies. In the second pass of IDCT, the final IDCT outputs after the 3-bit down-shift would be within 9-bit range of [−256, 255].

Therefore, the upper bound for the dynamic range of our proposed structure is 13-bit for the 12-bit inputs. That means, for the popular case that the input DCT coefficients are in the range of [−2048, 2047], K=3 is the limit for 16-bit IDCT implementations while K=11 is the upper limit for 24-bit and K=19 is the upper limit for 32-bit architectures.

IEEE-1180 Test

IEEE-1180 provides a set of specific criteria to measure the compliance of 8×8 IDCT to the ideal IDCT as discussed in IEEE CAS Standards Committee, "IEEE standard specificaerror (pmse), overall mean-square error (omse), peak mean error (pme), and overall mean error (ome) need to compute for the pseudo-random input blocks generated at 10000 and 1000000 iterations. The randomly generated block integers should cover the following five ranges, i.e., [−5, 5], [−256, 255], [−300, 300], [−384, 383] and [−512, 511] with positive and negative sign. A fixed-point IDCT could be considered to be compliant with IEEE-1180 standard if only it satisfies the conditions of ppe<=1, pmse<=0.06, omse<=0.02, pme<=0.015 and oms<=0.0015 for all the input ranges.

Table 4 lists the IEEE-1180 results of the proposed lifting-based IDCT for different K up-shift values, which represents the 32-bit, 24-bit and 16-bit implementation, respectively. Due to the limited space, Table 4 only includes the results for the three input ranges of common practical interest, i.e., [−256, 255], [−384, 383] and [−512, 511] with the positive sign at 1000000 iterations. In order to show pixel-wise errors more clearly, the percentage of pixel-wise errors (pep) is also included in the table. From these results, we can see that within the 32-bit word length constraint, the proposed lifting-based fixed-point IDCT solution delivers super high-accuracy approximation (omse=1.78e-04 for K=18); and 24-bit implementation also leads to a very high accuracy approximation (omse=5.95e-004 for K=10). The percentage of pixel-wise error clearly shows the proposed algorithm is very accurate (less than 0.06% of the reconstructed video pixels are different from the original video pixels and in those very rare cases, the mismatch is no more than 1 pixel value apart) for 24-bit and 32-bit implementations. Moreover, K=6 is the minimal up-scaling bits for our implementations in order to pass IEEE-1180 tests fully. Although the 16-bit implementation of K=3 in this particular structure cannot pass IEEE-1180 tests, it discloses an interesting observation that only high accurate lifting parameters would not certainly lead to high accuracy approximation.

TABLE 4

IEEE-1180 test results of the proposed high-accuracy IDCT algorithm.

1000000 iterations

| Input Range | Scaling value | ppe $\leq 1$ | pmse $\leq 0.06$ | omse $\leq 0.02$ | pme $\leq 0.015$ | ome $\leq 0.0015$ | pep | Pass test? |
|---|---|---|---|---|---|---|---|---|
| [−256, 255] | K = 3 | 1 | 4.44e−001 | 9.36e−002 | 4.44e−001 | 7.12e−003 | 9.36% | No |
|  | K = 6 | 1 | 3.93e−002 | 9.30e−003 | 3.93e−002 | 6.14e−004 | 0.93% | Yes |
|  | K = 10 | 1 | 2.81e−003 | 5.95e−004 | 2.81e−003 | 3.65e−005 | 0.06% | Yes |
|  | K = 18 | 1 | 3.04e−004 | 1.78e−004 | 3.10e−005 | −2.94e−006 | 0.02% | Yes |
| [−384, 383] | K = 3 | 1 | 2.96e−001 | 6.09e−002 | 2.96e−001 | 4.67e−003 | 6.09% | No |
|  | K = 6 | 1 | 2.64e−002 | 6.18e−003 | 2.64e−002 | 4.04e−004 | 0.62% | Yes |
|  | K = 10 | 1 | 1.73e−003 | 4.16e−004 | 1.73e−003 | 2.73e−005 | 0.04% | Yes |
|  | K = 18 | 1 | 2.76e−004 | 1.72e−004 | 5.50e−005 | −1.09e−006 | 0.02% | Yes |
| [−512, 511] | K = 3 | 1 | 2.23e−001 | 4.54e−002 | 2.23e−001 | 3.53e−003 | 4.54% | No |
|  | K = 6 | 1 | 1.99e−002 | 4.64e−003 | 1.99e−002 | 3.19e−004 | 0.46% | Yes |
|  | K = 10 | 1 | 1.43e−003 | 3.40e−004 | 1.43e−003 | 1.80e−005 | 0.03% | Yes |
|  | K = 18 | 1 | 3.22e−004 | 1.78e−004 | 2.90e−005 | 2.72e−006 | 0.02% | Yes |

Drifting Tests in Practical MPEG-2 and MPEG-4 Coders

Due to the closely-matched nature of the forward-inverse lifting, the mismatch between our lifting-based IDCT and DCT is mitigated. In fact, perfect reconstruction (no mismatch at all) for the integer space in the 8-bit range [−256, 255] is achievable when the DCT coefficient range is extended to [−8192, 8191] (14-bit representation is needed instead of 12-bit). This bit expansion comes from the fact that there are still butterflies left in our structure shown in FIG. 5 and FIG. 6. And each butterfly carries an expansion factor of $\sqrt{2}$. Obviously, if both of our fixed-point forward and inverse transform are employed in the encoder, there would not be any drifting effect whatsoever.

Figure 10:
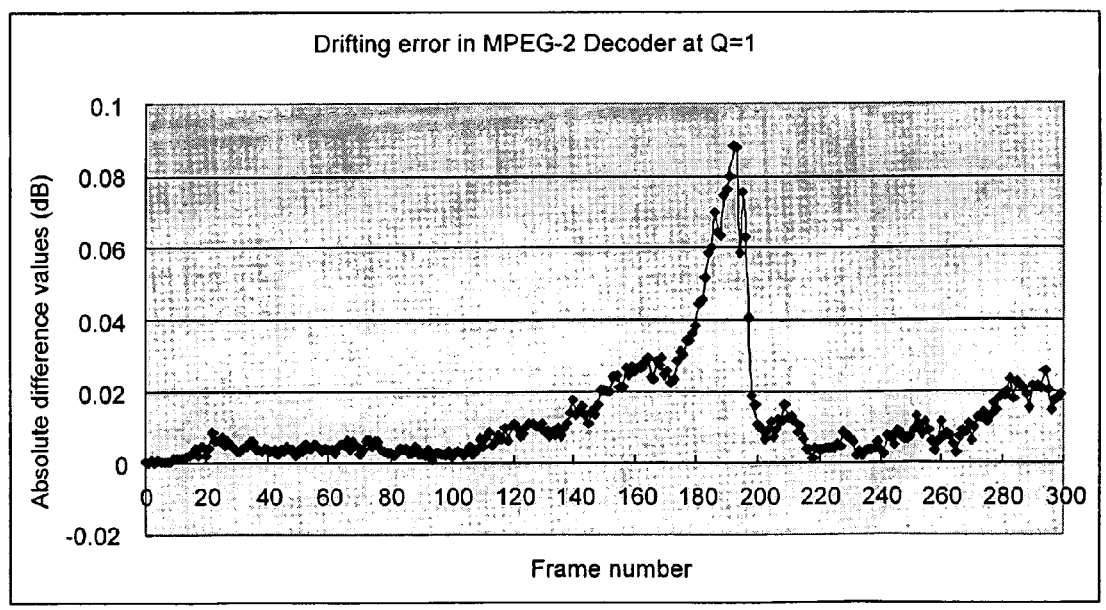
FIG. 10 shows our IDCT drifting tests for the 300-frame 'Foreman' CIF sequence in the MPEG-2 decoder at quantization stepsize=1. In this example, the encoder employed the true floating-point IDCT to generate the compressed bit-stream.
Figure 11:
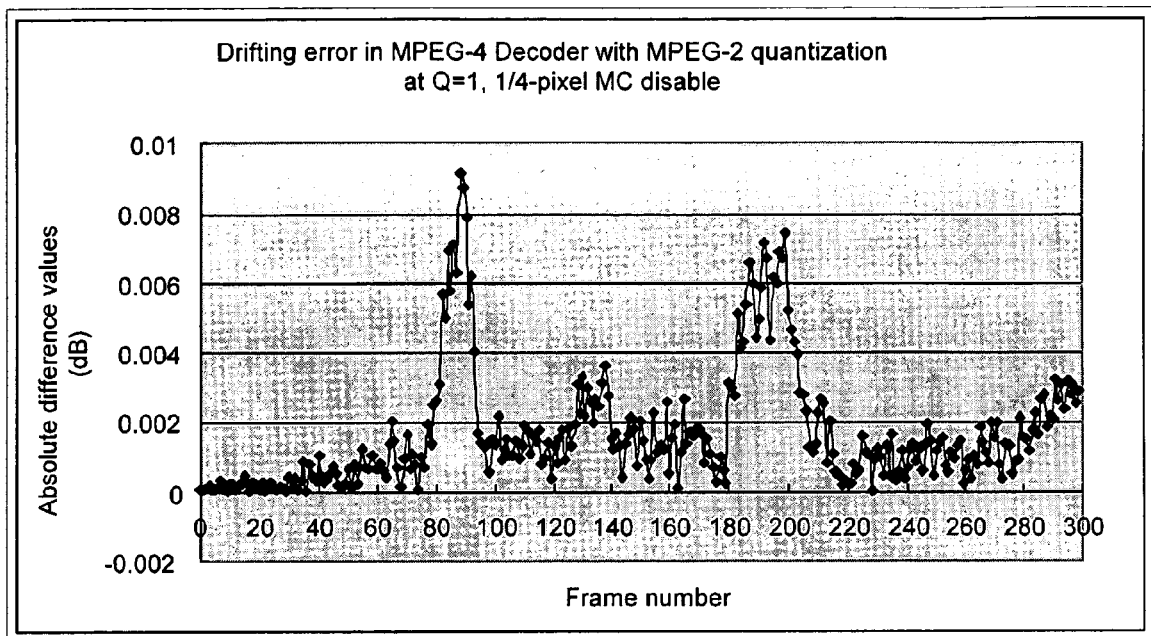
FIG. 11 depicts drifting errors for the 300-frame 'Foreman' CIF sequence using our high-accuracy IDCT in MPEG-4 decoder with MPEG-2 quantization module with quantization stepsize=1 and ¼-pixel motion compensation disable. The encoder employs the true floating-point IDCT to generate the compressed bit-stream.

Drifting is the effectively-random deviation of decoders from the values that are modelled in the encoder. Drifting tests are carried on the coders of MPEG-2 and MPEG-4. In the encoders, double-precision floating-point DCT and IDCT are used, and all pictures are coded as P-frames except the first one is coded as I-frame. To evaluate the drifting effects better, we consider the extreme worse-case scenario by disabling the intra macroblock refresh in encoder and setting quantization step size Qp=1. At the decoder side, the proposed lifting-based IDCT and double-precision floating-point IDCT are used to reconstruct the sequences, respectively. Peak signal-to-noise ratio (PSNR) values are then computed and their absolute difference values are used to evaluate the drifting effects. FIG. 10 and FIG. 11 illustrate the experiment results of the popular Foreman CIF test sequence (total 300 frames) in MPEG-2 and MPGE-4 coders for our 32-bit fixed-point IDCT implementation at K=18. In the MPEG-2 decoder, the average drifting is 0.0043 dB among the first 131 frames, and 0.01258 dB in the total 300 frames. In the MPEG-4 coder with MPEG-2 quantization module and quarter-pixel motion compensation disable, the average drifting is 0.001369 dB among the first 131 frame, and 0.001714 dB among the 300 frames. These results clearly confirm that the proposed IDCT transform has very high approximation accuracy and leads to virtually drifting-free reconstruction at the worst-case scenario set-up.

The various embodiments come within the scope of the present invention. The inventors' preferred embodiments, which are described in detail herein, are exemplary of all possible embodiments that practice the spirit of the present invention. As illustrative examples of our method, we have developed specific instances of 8×8 DCT and IDCT transforms, commonly used in image/video processing. The discussion of these specific embodiments should not be construed as limiting the scope of the appended claims. For example, the invention is applicable not only to the image/video data, but also to the processing of signals, images, and any other multi-dimensional signals, that are either captured directly in digital format or are converted to or expressed in digital format. It is understood that the above description is illustrative rather than limiting.

What is claimed is:

1. An apparatus for block coding of windows of digitally represented signal elements of block size M, where M is any integer greater than unity, chosen from one of the dimensionalities of the signal, comprising:
   a multidimensional signal encoder or decoder having an invertible transformation of the signal elements, wherein accuracy of the invertible transformation is improved by incorporating a pre-processing left-shift operation of a predetermined number of bits to the signal elements prior to the invertible transformation and a post-processing right-shift operation of the predetermined number of bits plus three bits to the modified signal elements after the invertible transformation and wherein the invertible transformation is representable by a series of only the following elements:
   i) butterfly steps;
   ii) lifting steps, wherein the choice of coefficients is complex;
   iii) planar rotations;
   iv) scaling; and
   v) reflections.

2. The apparatus of claim 1 wherein the invertible transformation is a unitary transform.

3. The apparatus of claim 1 wherein the invertible transformation is an approximation of a unitary transform.

4. The apparatus of claim 1 wherein the invertible transformation is an approximation of a forward discrete cosine transform.

5. The apparatus of claim 1 wherein the invertible transformation is an approximation of an inverse discrete cosine transform.

6. The apparatus of claim 1 wherein the lifting steps have real coefficients.

7. The apparatus of claim 1 wherein the lifting steps have real rational coefficients.

8. The apparatus of claim 1 wherein the lifting steps have dyadic rational coefficients in the form of $$\frac{k}{2^n}$$

where k and n are integers.

9. The apparatus of claim 1 wherein the lifting steps have coefficients selected within a $$\pm \frac{1}{8}$$

range from their theoretical values listed in Tables 1, 2, or 3 of this application.

10. The apparatus of claim 1 wherein the invertible transform is representable using only butterflies and lifting steps.

11. The apparatus of claim 10 wherein the lifting steps have rational coefficients.

12. The apparatus of claim 10 wherein the lifting steps have dyadic rational coefficients.

13. The apparatus of claim 1 wherein the lifting steps are implemented as a series of binary-shift-and-add operations.

14. The apparatus of claim 2 wherein the invertible transformation is modified with permutations, sign changes, and scaling changes of either inputs, outputs or intermediate values.

15. A method for coding, storing, transmitting, or decoding length M blocks of digitally represented signal elements, where M is any integer greater than unity, the method comprising the following steps, wherein the following are applied:
 a. pre-processing signal elements to modify the signal elements by applying a left-shift operation of a predetermined number of bits to the signal elements prior to an invertible transformation;
 b. forward transforming the modified signal elements using an encoder;
 c. quantizing and entropy coding transform output coefficients using the encoder;
 d. transmitting or storing entropy coded data;
 e. decoding the entropy coded data using a decoder;
 f. dequantizing the quantized transform output coefficients using the decoder;
 g. inverse transforming the dequantized transform output coefficients to reconstruct the modified signal elements using the decoder; and
 h. post-processing of the modified signal elements to reconstruct the modified signal elements by applying a right-shift operation of the predetermined number of bits plus three bits to the modified signal elements after the invertible transformation.

16. An apparatus for block coding of windows of digitally represented signal elements of block size M, where M is any integer greater than unity, chosen from one of the dimensionalities of the signal, comprising:
 a multidimensional signal encoder or decoder having an invertible transformation of the signal elements, wherein accuracy of the invertible transformation is improved by incorporating a pre-processing left-shift operation of a predetermined number of bits to the signal elements prior to the invertible transformation and a post-processing right-shift operation of the predetermined number of bits plus three bits to the modified signal elements after the invertible transformation and wherein
 a. the invertible transformation is an approximation of a discrete cosine transform (DCT) or an inverse discrete cosine transform (IDCT); and
 b. the approximation is representable by a series of only the following elements:
  i) butterfly steps;
  ii) lifting steps, wherein the choice of coefficients is real; and
  iii) planar rotations.

17. The apparatus of claim 16 wherein the lifting steps have rational coefficients.

18. The apparatus of claim 16 wherein the lifting steps have dyadic rational coefficients in the form of $$\frac{k}{2^n}$$

where k and n are integers.

19. The apparatus of claim 18 wherein the lifting steps have coefficients selected within a $$\pm \frac{1}{8}$$

range from their theoretical values listed in Tables 1, 2, or 3 of this application.

20. The apparatus of claim 16 wherein the approximate transform is representable using only butterflies and lifting steps.

21. The apparatus of claim 20 wherein the lifting steps have rational coefficients.

22. The apparatus of claim 20 wherein the lifting steps have dyadic rational coefficients.

23. The apparatus of claim 16 wherein the dyadic lifting steps are implemented as a series of binary-shift-and-add operations.

24. The apparatus of claim 16 wherein the transformation is modified with permutations, sign changes, and scaling changes of either inputs, outputs or intermediate values.

25. The apparatus of claim 1, wherein the predetermined number of bits is selected to be in the range 3 to 19, inclusive.

26. The apparatus of claim 1, wherein the representation of the invertible transformation approximation passes ISO/IEC 23002-1 accuracy tests and requires only 16 bits for representation.

27. The apparatus of claim 1, wherein the representation of the invertible transformation approximation passes ISO/IEC 23002-1 accuracy tests by a factor of 100 times or more and requires only 32 bits for representation.

28. The method of claim 15, wherein the predetermined number of bits is selected to be in the range 3 to 19, inclusive.

29. The method of claim 15, wherein a representation of the invertible transformation approximation passes ISO/IEC 23002-1 accuracy tests and requires only 16 bits for representation.

30. The method of claim 15, wherein a representation of the invertible transformation approximation passes ISO/IEC 23002-1 accuracy tests by a factor of 100 times or more and requires only 32 bits for representation.

31. The apparatus of claim 16, wherein the predetermined number of bits is selected to be in the range 3 to 19, inclusive.

32. The apparatus of claim 16, wherein the representation of the invertible transformation approximation passes ISO/IEC 23002-1 accuracy tests and requires only 16 bits for representation.

33. The apparatus of claim 16, wherein the representation of the invertible transformation approximation passes ISO/IEC 23002-1 accuracy tests by a factor of 100 times or more and requires only 32 bits for representation.

* * * * *